US012401223B2

(12) United States Patent
Waymeyer

(10) Patent No.: US 12,401,223 B2
(45) Date of Patent: Aug. 26, 2025

(54) WIRELESS POWER TRANSFER TO A DOOR OF A REFRIGERATOR APPLIANCE

(71) Applicant: Haier US Appliance Solutions, Inc., Wilmington, DE (US)

(72) Inventor: Jordan Andrew Waymeyer, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 266 days.

(21) Appl. No.: 17/881,738

(22) Filed: Aug. 5, 2022

(65) Prior Publication Data
US 2024/0047995 A1  Feb. 8, 2024

(51) Int. Cl.
| F25D 29/00 | (2006.01) |
| F25D 21/04 | (2006.01) |
| H02J 50/05 | (2016.01) |
| H02J 50/12 | (2016.01) |
| H02M 3/158 | (2006.01) |
| F25D 23/02 | (2006.01) |

(52) U.S. Cl.
CPC .............. *H02J 50/05* (2016.02); *F25D 21/04* (2013.01); *F25D 29/00* (2013.01); *H02J 50/12* (2016.02); *H02M 3/158* (2013.01); *F25D 23/028* (2013.01); *F25D 2323/021* (2013.01); *F25D 2400/02* (2013.01); *F25D 2400/06* (2013.01); *F25D 2400/40* (2013.01); *F25D 2700/02* (2013.01)

(58) Field of Classification Search
CPC .. F25D 23/028; F25D 29/00; F25D 2323/021; F25D 2400/02; F25D 2400/06; F25D 2400/40; F25D 2700/02; H02J 50/05; H02J 50/12
See application file for complete search history.

(56) References Cited

U.S. PATENT DOCUMENTS

| 8,250,873 | B2 | 8/2012 | Yoon et al. |
| 10,036,585 | B2 | 7/2018 | McCollough et al. |
| 10,775,092 | B2 | 9/2020 | Wetekamp et al. |
| 10,837,695 | B2 | 11/2020 | Baum et al. |
| 2004/0047165 | A1* | 3/2004 | Luo ........................ H02M 7/538 |
| | | | 363/25 |
| 2017/0214277 | A1* | 7/2017 | Lee ........................ F25D 27/005 |
| 2019/0170427 | A1* | 6/2019 | Baum ..................... F25D 23/02 |
| 2020/0266715 | A1* | 8/2020 | Ness ....................... H02M 7/219 |

OTHER PUBLICATIONS

KR 10-2020-0117316 (English Translation) (Year: 2020).*

* cited by examiner

*Primary Examiner* — Jonathan Bradford
(74) *Attorney, Agent, or Firm* — Dority & Manning, P.A.

(57) ABSTRACT

A refrigerator appliance having a cabinet defining a chamber and a rotatably hinged door to at least partially seal the chamber or provide access to the chamber. The cabinet includes a resonant LC circuit transmitter and the door includes a resonant LC receiver to transfer electric power from the cabinet to the door.

14 Claims, 5 Drawing Sheets

WIRELESS POWER TRANSFER TO A DOOR OF A REFRIGERATOR APPLIANCE

FIELD OF THE INVENTION

The present disclosure is related generally to refrigerator appliances and more particularly to providing electric power to a refrigerator appliance door.

BACKGROUND OF THE INVENTION

Refrigerator appliances generally include a cabinet with one or more chilled compartments, e.g., a fresh food compartment, a freezer compartment, or the like, to maintain foods at low temperatures (i.e., lower than ambient). The chilled compartment(s) of a refrigerator are typically accessible through an opening, with access provided by one or more doors connected by hinges to the appliance cabinet.

Refrigerator appliances having two rotatably mounted opposing doors for access to a single opening, e.g., the fresh food compartment, are generally referred to as "French doors" refrigerators. French doors have desirable features, for example, lighter weight for each door and increase accessibility to the refrigerator cabinet.

However, French doors require additional sealing areas; in particular, the middle portion of the refrigerator opening where the two doors meet must maintain a seal when the doors are closed. Accordingly, some French door refrigerators include an articulating mullion rotatably attached via pivot points or hinges to one of the doors such that access to the compartment via the opening is not obstructed by the mullion when the door to which the articulating mullion is attached is opened. When closed, each of the doors sealingly engages the mullion with opposing edges of the doors spaced apart for clearance.

Some mullions for French door refrigerator appliances, and in particular articulated mullions, are at least partially formed of thermally conductive materials, such as e.g., metal. Thermally conductive materials are chosen because they typically have advantageous magnetic properties which can facilitate sealing of the doors with a magnetized sealing element when the doors of the refrigerator appliance are in a closed position. However, an inward facing portion of the thermally conductive material is in contact with the chilled air in the compartment and cools an exterior or front wall of the mullion that is in contact with relatively warm ambient air. When the warm ambient air contacts the cool front wall, the warm air is cooled and may cause condensation or "sweat" on the front wall depending on the humidity of the ambient air. The condensation is unsightly and may collect in areas that can cause a safety concern, such as development of mold or mildew, or affect the performance of the refrigerator appliance.

To prevent condensation, some articulating mullions include an electrically powered heating device within the mullion to remedy this undesirable effect. To provide electric power to these heating devices, electrically conductive wires are typically routed from the refrigerator cabinet to the door to which the articulating mullion is attached, and then to the heating element within the mullion. However, the design of some pivot points linking a door to a refrigerator appliance cabinet make the routing of wires undesirable, impractical, or impossible.

Accordingly, refrigerator appliances with improved electric power transfer from the refrigerator cabinet to the refrigerator door to address one or more of the above-described challenges would be beneficial.

BRIEF DESCRIPTION OF THE INVENTION

The present subject matter is directed to a refrigerator appliance having a cabinet and a pivotally attached door that includes features for improved electric power transfer to the door. In particular, the refrigerator appliance includes features that may transfer power from the cabinet to the door without routing electrically conductive wires from the cabinet to the door. Additional aspects and advantages of the invention will be set forth in part in the following description, or may be apparent from the description, or may be learned through practice of the invention.

In an exemplary aspect, a refrigerator appliance defines a vertical direction, a lateral direction, and a transverse direction, the vertical, lateral, and transverse directions being mutually perpendicular. The refrigerator appliance comprises a cabinet comprising a first vertical wall and a second vertical wall spaced laterally from the first vertical wall, a bottom wall and a top wall spaced vertically above the bottom wall, the first and second vertical walls and the bottom and top walls defining a vertical and a lateral dimension of a chamber. The refrigerator appliance further comprises a resonant LC circuit transmitter, and a door rotatably hinged to the cabinet and supported for rotation between a closed position in which an inner surface of the door abuts at least one of the first and second vertical walls and the bottom and top walls to seal a portion of the chamber, and an open position providing access to a portion of the chamber, the door comprising a resonant LC circuit receiver.

In another exemplary aspect, a door assembly for a refrigerator appliance comprises a door comprising an inner surface, an upper portion, a lower portion, and an LC circuit receiver comprising an LC receiver, a bridge rectifier, a buck converter, and an articulating mullion rotatably hinged to the door, the articulating mullion comprising a resistive heating element electrically connected to the buck converter.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
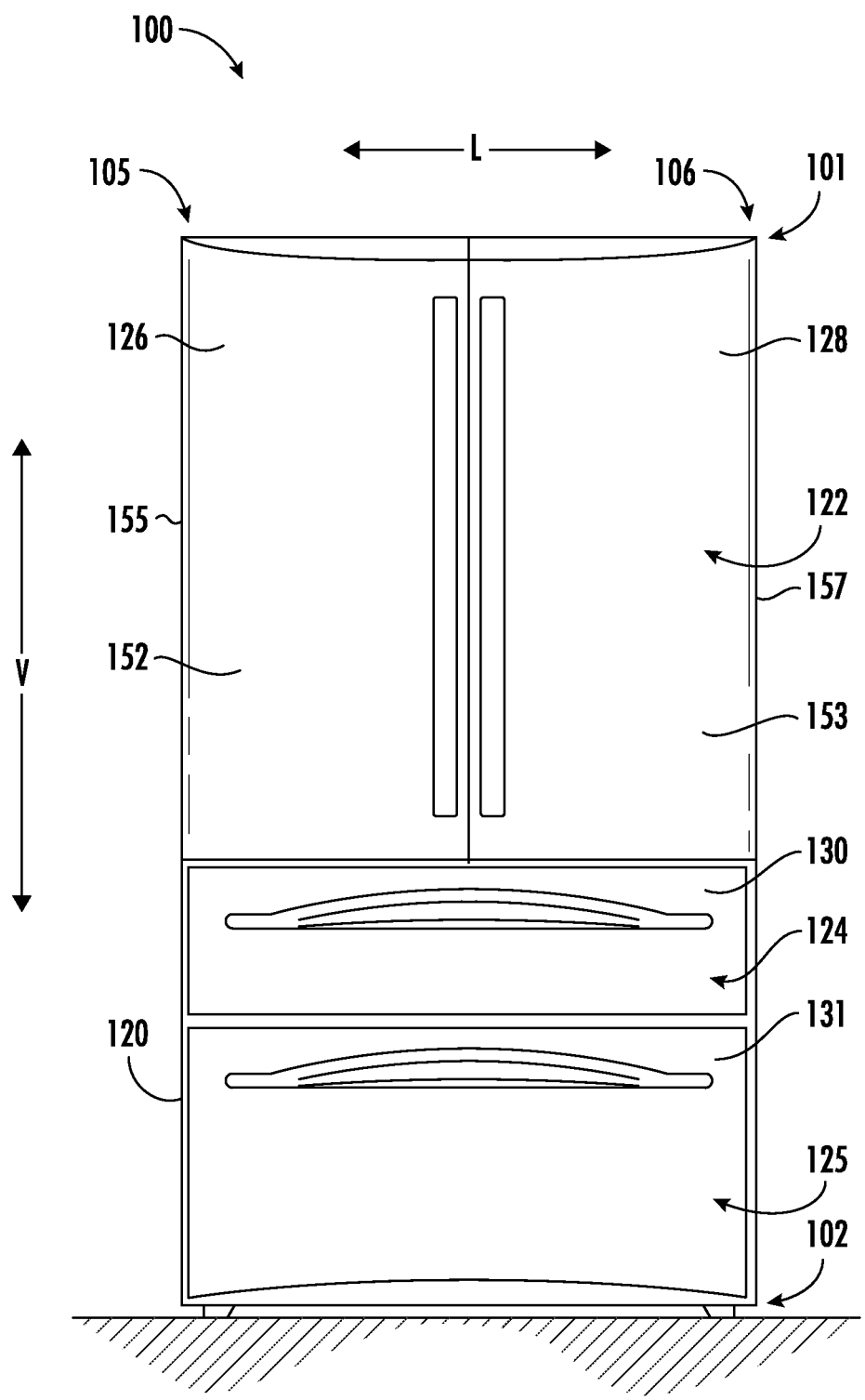
FIG. 1 provides a front view of a refrigerator appliance according to an exemplary embodiment of the present disclosure.

Reference now will be made in detail to embodiments of the invention, one or more examples of which are illustrated in the drawings. Each example is provided by way of explanation of the invention, not a limitation of the invention. It will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Using the teachings disclosed herein, one of skill in the art will understand that the present technology can be used with other types of refrigerators (e.g., side-by-side) or a freezer appliance as well. Consequently, the description set forth herein is for illustrative purposes only and is not intended to limit the technology in any aspect.

For ease of illustration only, exemplary embodiments are shown on one door, the left door, of a French door refrigerator appliance. One of ordinary skill in the art will understand that the features described can be used on other doors, for example the right door of a French door refrigerator appliance, or on a drawer-type door to a refrigerator or freezer appliance.

As used herein, the terms "first," "second," "third," and "fourth" may be used to distinguish one component from another and are not intended to signify importance of the individual components. Terms such as "inner" and "outer" refer to relative directions with respect to the interior and exterior of the refrigerator appliance, and in particular the food storage chamber(s) defined therein. For example, "inner" or "inward" refers to the direction towards the interior of the refrigerator appliance. Terms such as "left," "right," "front," "back," "top," "bottom," "above," or "below" are used with reference to the perspective of a user accessing the refrigerator appliance. For example, a user stands in front of the refrigerator to open the doors and reaches into the food storage chamber(s) to access items therein.

As used herein, "substantially" means within ten degrees (10°) of the noted direction or within about ten percent (10%) of the noted value or within manufacturing tolerances, whichever margin is greater, unless specifically stated otherwise. Moreover, as used herein, where a wall of articulating mullion (e.g., front wall) is described as being formed of a particular material, the wall can be considered formed of the particular material even if another material is attached thereto, integrated or embedded into the wall, or coated or plated onto a surface of the wall.

FIG. 1 provides a front view of a refrigerator appliance 100 according to an exemplary embodiment of the present disclosure. Refrigerator appliance 100 extends between a top 101 and a bottom 102 along a vertical direction V. Refrigerator appliance 100 also extends between a first side 105 and a second side 106 along a lateral direction L. Further, refrigerator appliance 100 extends between a front and a back along a transverse direction T (not shown), which is a direction orthogonal to the vertical direction V and the lateral direction L. Vertical direction V, lateral direction L, and transverse direction T are mutually perpendicular and form an orthogonal direction system.

Refrigerator appliance 100 includes a housing or cabinet 120 defining a fresh food chamber 122 and one or more freezer chambers, such as a first freezer chamber 124 and a second freezer chamber 125, which may both be arranged below fresh food chamber 122 along the vertical direction V. As illustrated, fresh food chamber 122 is bounded by a first vertical wall 108 at the first side 105 and a second vertical wall 110 at the second side 106, such walls spaced apart in the lateral direction, and horizontal top wall 140 (as a top side) at the top 101 and at the lower boundary by bottom wall 180 (as a bottom side), defining the vertical and lateral dimensions of the chamber 122. In this configuration, refrigerator appliance 100 may generally be referred to as a bottom mount, or bottom freezer, refrigerator. Cabinet 120 also defines a mechanical compartment (not shown) for receipt of a sealed cooling system (not shown). It will be appreciated that the present subject matter can be used with other types of refrigerator appliances as well, such as e.g., top mount, or top freezer, refrigerator appliances. Consequently, the description set forth herein is not intended to limit the present subject matter in any aspect.

Figure 2:
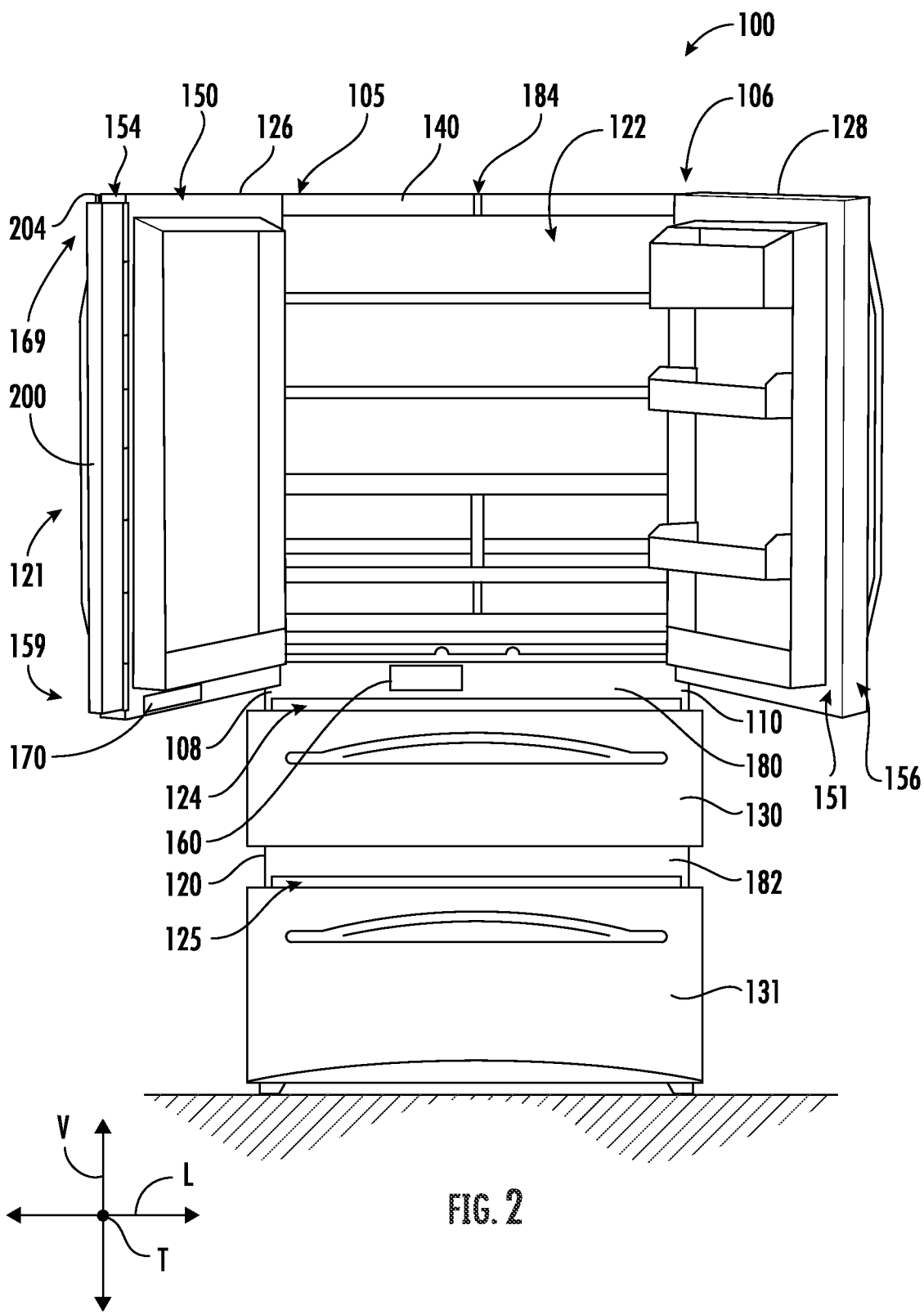
FIG. 2 provides a front view of the refrigerator appliance of FIG. 1 with refrigerator doors shown in an open configuration.

First and second refrigerator doors 126, 128, respectively, are hinged and supported for rotation to an edge of cabinet 120 at first 105 and second 106 sides, respectively, between an open position providing access to fresh food chamber 122 as illustrated in FIG. 2 or a closed position in which inner surface 150 of the door abuts the vertical first and second vertical walls 108, 110 and the top wall 140 and bottom wall 180 of the cabinet, sealing a portion of fresh food chamber 122 as illustrated in FIG. 1. For example, upper and lower hinges 186, at upper portion 169 and lower portion 159 of exemplary door 126, may couple each door 126, 128 to cabinet 120. When first and second doors 126, 128 are configured as illustrated in FIGS. 1 and 2, the door arrangement is sometimes referred to as a "French door" configuration. Freezer doors, such as a first freezer door 130 and a second freezer door 131, may be arranged below refrigerator doors 126, 128 for accessing one or more freezer chambers, such as first and second freezer chambers 124, 125, respectively. In the exemplary embodiment shown in FIG. 1, freezer doors 130, 131 are coupled to freezer drawers (not shown) slidably coupled within first and second freezer chambers 124, 125. Such drawers are thus generally "pull-out" drawers in that they can be manually moved into and out of freezer chambers 124, 125 on suitable slide mechanisms. Each door 126, 128, 130, 131 can include a handle for accessing one of the chambers 122, 124, 125 of refrigerator appliance 100.

FIG. 2 provides a front perspective view of refrigerator appliance 100 showing refrigerator doors 126, 128 in an open position to reveal the interior of fresh food chamber 122.

Door 126 of refrigerator appliance 100 includes an inner surface 150 and an outer surface 152 (FIG. 1). Inner surface 150 generally defines a portion of the interior of fresh food chamber 122 when door 126 is in a closed position as shown in FIG. 1. Outer surface 152 is generally opposite inner surface 150 and defines a portion of the exterior of refrigerator appliance 100 when door 126 is in the closed position. Door 126 includes first and second side surfaces 154, 155, respectively, extending between and connecting inner surface 150 and outer surface 152. As illustrated for example in FIG. 4, the intersection of first inner surface 150 and first side surface 154 form edge 158. The same construction may result in similarly formed edges at the other intersections of side surfaces 155, 156, 157 and inner surface 151 and outer surfaces 152, 153. It will be appreciated that door 128 can be configured in the same or similar manner as door 126 with inner surface 151, outer surface 153 and third and fourth side surfaces 156, 157, respectively, extending between and connecting inner surface 151 and outer surface 153. Moreover, it will further be appreciated that freezer doors 130, 131 can likewise include inner, outer, and side surfaces 150, 152, 154.

As further shown in FIG. 2, refrigerator appliance 100 includes various mullions to generally divide the various chambers of refrigerator appliance 100 and/or prevent leakage therefrom. In the present embodiment of a French door refrigerator, refrigerator appliance 100 includes an articulating mullion 200 disposed on first door 126 and a bottom wall 180 disposed between and separating fresh food chamber 122 and first freezer chamber 124. Refrigerator appliance 100 also includes a stationary mullion 182 disposed between and separating first freezer chamber 124 and second freezer chamber 125. Bottom wall 180 and stationary mullion 182 generally extend along the lateral direction L between first end 105 and second end 106 of refrigerator appliance 100 and generally extend along the vertical direction V to separate the various chambers of refrigerator appliance 100. Moreover, although not shown in FIG. 2, bottom wall 180 and stationary mullion 182 generally extend along the transverse direction T approximately the depth of refrigerator appliance 100.

Refrigerator appliance 100 includes an articulating mullion 200 rotatably coupled or connected to door 126 and positioned so that a long axis of the mullion 200 is parallel to the vertical direction V as shown in FIG. 2. In other embodiments, articulating mullion 200 can be connected to door 128. In yet other embodiments, articulating mullion 200 can be connected to any suitable door of refrigerator appliance 100. Moreover, refrigerator appliance 100 can include any suitable number of articulating mullions 200. For example, where refrigerator appliance 100 has a quad door configuration (i.e., having two rotatably mounted "French door" fresh food doors and two rotatably mounted "French door" freezer doors positioned below the fresh food doors), refrigerator appliance 100 can include one articulating mullion 200 connected to one of the freezer doors and one articulating mullion connected to one of the fresh food doors.

In embodiments of the present application, the refrigerator appliance 100 includes a resonant inductor-capacitor circuit transmitter assembly and a resonant inductor-capacitor circuit receiver assembly, sometimes referred to as, respectively, a resonant LC circuit transmitter assembly and a resonant LC circuit receiver assembly, or simply an LC transmitter and an LC receiver. In the illustrative embodiment shown in FIG. 2, a resonant LC transmitter assembly 160 is shown in bottom wall 180 and a resonant LC receiver assembly 170 is shown in a lower portion 159 of door 126. The transmitter assembly 160 and the receiver assembly 170 are positioned such that, when the door 126 is closed, the transmitter assembly 160 and the receiver assembly 170 are sufficiently close to each other to allow the transmitter to electronically communicate with the receiver. For example, when the transmitter assembly 160 and the receiver assembly 170 are aligned such that the lateral L dimension and the vertical V dimension of each overlap sufficiently to establish communication from the transmitter assembly 160 to the receiver assembly 170. Communication can be established when the transmitter assembly 160 produces and emits an electronic signal (e.g., a magnetic field) and the receiver assembly 170 detects the electronic signal. When the transmitter assembly 160 and receiver assembly 170 are in electronic communication with each other, they are sometimes said to be inductively coupled. In the present embodiment, when the door 126 is closed, the transmitter assembly 160 and the receiver assembly 170 are generally proximate to each other and separated by an air gap 171 (FIG. 3) preferably between 0.0 inch (0.0 mm) and 0.5 inch (12.7 mm), more preferably between 0.13 inch (3.3 mm) and 0.38 inch (9.7 mm), more preferably still, the air gap 171 is 0.25 inch (6.4 mm).

In an embodiment, a door assembly 121 comprises exemplary door 126 as described above, an LC receiver circuit assembly, and an articulating mullion. In the exemplary embodiment of the door assembly 121, the door 126 includes a first inner surface 150 configured to contact the cabinet 120 when the door is in the closed position of FIG. 1. In particular, the vertical edge of the first vertical wall 108 sealingly contacts the portion of the inner surface 150 at the first side 105 of the cabinet 120. Similarly, the inner surface 150 at the upper portion 169 of door 126 sealingly contacts the top wall 140 of the cabinet 120 and the inner surface 150 sealingly contacts the bottom wall 180 to seal at least a portion of the fresh food chamber 122 when the door 126 is in the closed position (FIG. 1). Lower portion 159 of door 126 includes a receiver assembly 170 as described below. In an embodiment, the receiver assembly includes an LC receiver 172, a bridge rectifier 173, and a buck converter 174 as more thoroughly described below. An articulating mullion 200 is rotatably hinged to door 126 with hinges 186. In embodiments, the mullion 200 includes a resistive heating element 250 electrically connected, in general, to the receiver assembly 170, and specifically to the buck converter 174.

Figure 3:
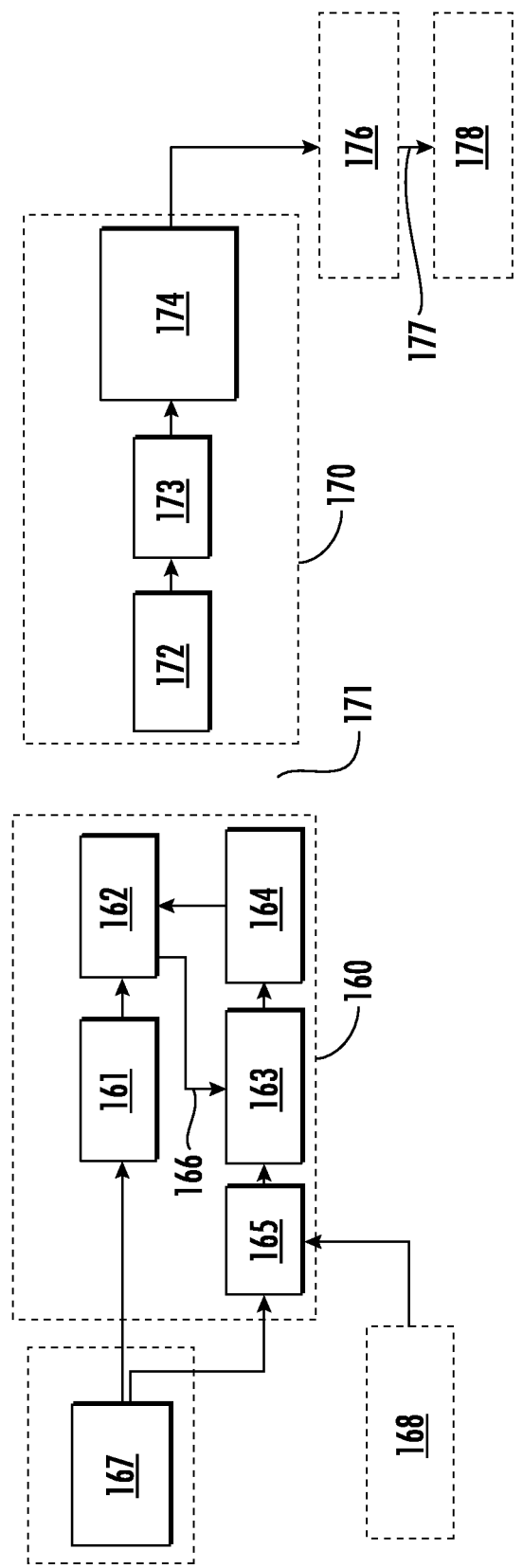
FIG. 3 provides a functional block diagram of a transmitter and a receiver circuit according to an exemplary embodiment of the present disclosure.

FIG. 3 illustrates transmitter assembly 160 and receiver assembly 170 as a circuit functional block diagram. The transmitter assembly 160 includes a filter stage 161, an LC tank 162, a metal-oxide-semiconductor field-effect transistor (MOSFET) 163, a half bridge inverter 164, and an interlock circuit 165. A suitable electric power supply 167 is provided to the transmitter assembly 160 through the cabinet 120 of the refrigerator appliance 100 to provide a prescribed voltage at a prescribed current. The voltage and current supplied by power supply 167 first passes through a filter stage 161 to decouple the supply voltage from the high frequency currents in the LC tank 162. In some cases, a suitable power supply 167 provides a direct current (DC) voltage (V) to the transmitter assembly 160. With a DC power supply, the filter stage 161 isolates or decouples the power supplied, for example 12 VDC, from the high frequency current required in the LC tank 162. In some cases, the LC tank 162 frequency is substantially 125 kHz, although other frequencies may have beneficial results.

The LC tank 162 is an inductor-capacitor circuit, sometimes known as an LC circuit or a resonant circuit. The LC tank is, in general, an electric circuit consisting of an inductor and a capacitor electrically connected in a parallel arrangement. The LC tank 162 can act as an electrical resonator, with electrical current oscillating at the circuit's natural resonant frequency. In some cases, the LC tank 162 is more efficient when operating at its natural frequency. To ensure operation at, or close to, the natural frequency, the LC tank 162 communicates with the MOSFET driver 163, providing feedback 166 regarding the operating frequency of the LC tank 162. The MOSFET driver 163 then drives the half-bridge inverter 164 which in turn drives the LC tank 162 at its natural frequency.

In an embodiment of the present disclosure illustrated in FIG. 3, an interlock circuit 165 is placed electronically in-line between the MOSFET driver 163 and the power supply 167. The interlock circuit 165 selectively allows power to flow from the power supply 167 to the MOSFET driver 163. When power flows to the MOSFET driver 163, the MOSFET driver 163 and the half-bridge inverter cooperate to drive the LC tank 162 at its natural resonance frequency as discussed above. When the interlock circuit 165 blocks the flow of power to the MOSFET driver 163, the LC tank 162 is not driven and current does not oscillate in the LC tank. In an illustrative embodiment, the interlock circuit 165 may include a door sensor 168, for example a Hall effect sensor, to determine if the door 126 is in a closed position (FIG. 1) or an open position (FIG. 2). In some embodiments, it may be desirable for the interlock circuit 165 to allow power to flow to the MOSFET driver 163 when the door 126 is in the closed position and to prevent the flow of power when the door 126 is not closed.

Beneficially, the oscillating current in the LC tank 162 creates a magnetic field. It is understood that a uniform oscillation frequency, in this case the natural resonant frequency of the LC tank, creates a uniform and consistent magnetic field. The LC tank 162 provides a magnetic field that is coupled with the LC receiver 172 in the receiver assembly 170 located in the lower portion 159 of door 126. When the magnetic field of the LC tank 162 is coupled with the LC receiver 172, the transmitter assembly 160 and receiver assembly 170, in general, and the LC tank 162 and the LC receiver 172 in particular, may be said to be inductively coupled. In an embodiment of the present disclosure, the natural resonant frequency of the LC receiver 172 is substantially the same as the natural resonant frequency of the LC tank 162 (i.e., the natural resonant frequency of the receiver assembly 170 substantially matches the natural resonant frequency of the transmitter assembly 160). Under some circumstances it may be beneficial for the frequencies of the LC tank 162 and the LC receiver 172 to differ one from the other, with the difference varying by up to, and including, 10%.

The magnetic field generated by the LC tank 162 induces an alternating current in the LC receiver 172 through inductive coupling. Thus, through inductive coupling, electric power is transferred generally from the transmitter assembly 160 to the receiver assembly 170, and specifically from the LC tank 162 to the LC receiver 172. The receiver assembly 170 may include a bridge rectifier 173 as shown in the embodiment of FIG. 3. The bridge rectifier is electrically connected to the LC receiver 172 and rectifies, or converts, the alternating current to a direct current. The direct current may be routed using current-carrying wires to electric loads in the door 126. In some embodiments, it may be desirable to reduce the direct current voltage output of the bridge rectifier 173 with a buck converter 174. A buck converter is sometimes known as a direct current to direct current (DC-to-DC) step-down converter, and is used to reduce, or "step down," voltage from an input to an output. The buck converter 174 reduces (i.e., "steps down") the direct current voltage from the rectifier 173 to a predetermined direct current voltage appropriate for the designed electric loads 178. The control circuit 176 may direct and selectively apply the voltage to electric loads 178 through current-carrying conductors or wires 177. In some embodiments, control circuit 176 may include sensors (e.g., thermometer(s) or hygrometer(s)) or logic elements to determine the application of the voltage. The reduced direct current voltage may be routed using current-carrying wires to electric loads 178 in the door 126, for example a light-providing device such as a light emitting diode (LED) (not shown) or a heating element 250 (described below).

Figure 4:
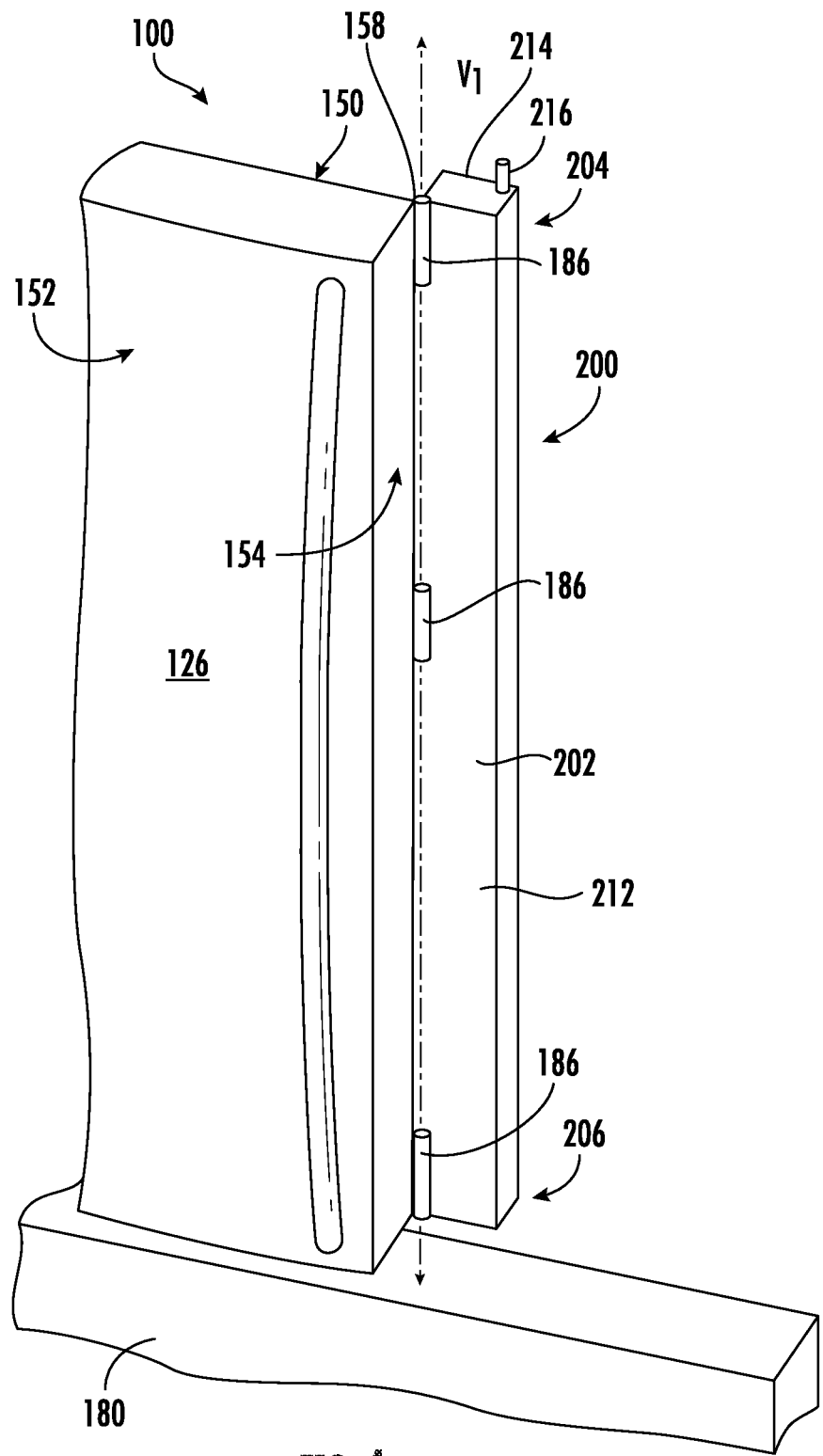
FIG. 4 provides a perspective view of a door and an articulating mullion connected to the door of the refrigerator appliance of FIG. 1.
Figure 5:
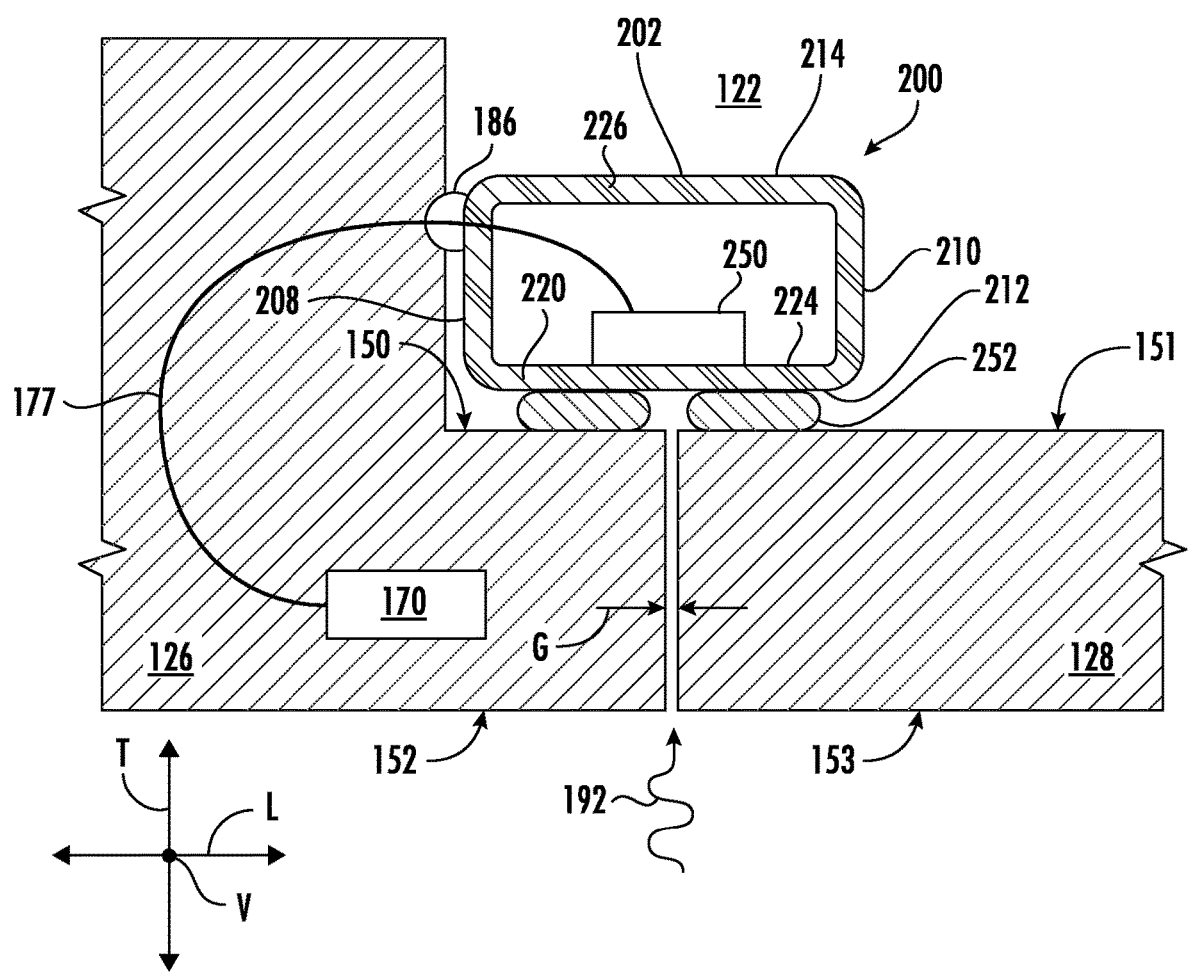
FIG. 5 is a cross-sectional view of doors of an exemplary refrigerator appliance in a closed position and contacting an exemplary articulating mullion according to an exemplary embodiment of the present disclosure.

Referring now to FIGS. 4 and 5, FIG. 4 provides a perspective view of an exemplary first door 126, bottom wall 180, and articulating mullion 200 connected to door 126 of exemplary refrigerator appliance 100 of FIGS. 1 and 2. FIG. 5 provides a close-up, cross-sectional view of first and second doors 126, 128 of exemplary refrigerator appliance 100 in a closed position and contacting articulating mullion 200 according to an exemplary embodiment of the present disclosure.

As shown in FIG. 4, articulating mullion 200 can be rotatably coupled or rotatably hinged, via hinges 186, to door 126. Articulating mullion 200 can be rotated or articulated about a vertical axis $V_1$, which extends along the vertical direction V through hinges 186 as shown.

As shown in the illustrative embodiment of FIGS. 4 and 5, articulating mullion 200 includes a body 202 which is shown as a generally rectangular cross-sectional shape for ease of illustration. It will be appreciated that body 202 can have any suitable cross-sectional shape as will be apparent to an ordinarily skilled artisan. Also for ease of illustration, body 202 is shown as generally hollow. In some embodiments, body 202 may be filled with an insulating material, for example polyurethane or expanded polystyrene. Body 202 extends between a top portion 204 and a bottom portion 206 along the vertical direction V, between a first end 208 and a second end 210 along the lateral direction L (FIG. 5), and between a front face 212 and a rear face 214 along the transverse direction T.

Articulating mullion 200 includes a tab 216 extending from body 202 as shown in FIG. 3. For this exemplary embodiment, tab 216 extends from top portion 204 of body 202. In some embodiments, tab 216 can extend from bottom portion 206 of body 202. In yet other embodiments, body 202 can include tabs 216 extending from both top portion 204 and bottom portion 206. Tab 216 may be sized and shaped to fit within and interact with a groove 184 defined in cabinet 120 of refrigerator appliance 100 (FIG. 2). For example, groove 184 may include cam surfaces that may interact with tab 216 to cause rotation of articulating mullion 200 from a first position to a second position when door 126 is rotated from a closed position (FIGS. 1 and 3) to an open position (FIG. 2) or vice versa.

As shown in FIGS. 4 and 5, body 202 includes a front wall 220 having a front face 212 and a rear face 224 opposite front face 212. When door 126 is in the closed position FIG. 4, or when both door 126 and door 128 are in the closed position FIG. 5, front wall 220 is oriented in a plane parallel to the vertical and lateral directions V, L. Likewise, front face 212 of front wall 220 is coplanar with the vertical and lateral direction V, L. Front face 212 of front wall 220 faces the exterior of refrigerator appliance 100 and rear face 214 of rear wall 226 faces the interior of refrigerator appliance 100 when door 126 is in a closed position.

In the illustrative embodiment of FIG. 5, within the body 202 is resistive heating element 250, generally centered along the lateral dimension of rear face 224 of front wall 220. The resistive heating element 250 may be any type heating element capable of converting electrical power to thermal energy, or heat, through, for example, Joule heating. For example, heating element 250 may be a metallic wire, ribbon, foil, or strip comprising a metallic alloy (e.g., an alloy of nickel and chromium), or a ceramic material, or a semiconductor, having a resistance to the flow of electric current. The heating element 250 may continuously extend along a portion or along the full vertical V length of the mullion 200, or may be made up of a plurality of segments spaced apart and extending along all or part of vertical V length of the mullion 200. In an exemplary embodiment of the present disclosure, heating element 250 may selectively receive power from LC receiver assembly 170 of FIG. 3. More specifically, buck converter 174 may provide a suitable voltage for heating element 250 through control circuit 176. In an embodiment, the electric load 178 may be the heating element 250. Power may be supplied to the heating element 250 through wires 177 routed from the receiver assembly 170 in the lower portion of door 126 and through the hinge 186 as illustrated in FIG. 5.

As shown in FIG. 5, when doors 126, 128 are in a closed position, a gap G is defined between doors 126, 128. Ambient air 192, which is generally warm relative to the cooled or chilled air of fresh food chamber 122 (or similarly first or second freezer chambers 124, 125) of refrigerator appliance 100, flows through gap G and contacts front face 212 of front wall 220 of articulating mullion 200. As articulating mullion 200 is positioned to block the airflow through gap G, articulating mullion 200 prevents relatively warm ambient air 192 from leaking into refrigerator appliance 100. Articulating mullion 200 also prevents cooled or chilled air from flowing out of refrigerator appliance 100. To prevent such leakage, first and second inner surfaces 150, 151 of each door 126, 128, respectively, or one or more gaskets 252 along such inner surfaces 150, 151, contact front face 212 of articulating mullion 200. To hermetically seal front face 212 with doors 126, 128, each door 126, 128, or gaskets 252, and articulating mullion 200 can include magnets or comprise materials having magnetic properties to seal doors 126, 128 in sealing engagement with articulating mullion 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance defining a vertical direction, a lateral direction, and a transverse direction, the vertical, lateral, and transverse directions being mutually perpendicular, the refrigerator appliance comprising:
   a cabinet defining a fresh food chamber and a freezer chamber, the cabinet comprising:
      a first vertical wall and a second vertical wall spaced laterally from the first vertical wall;
      a bottom wall and a top wall spaced vertically above the bottom wall, the first and second vertical walls and the bottom and top walls defining a vertical and a lateral dimension of a chamber, the bottom wall being disposed between the fresh food chamber and the freezer chamber; and
   a resonant LC circuit transmitter disposed in the bottom wall;
   a door rotatably hinged to the cabinet and supported for rotation between a closed position in which an inner surface of the door abuts at least one of the first and second vertical walls and the bottom and top walls to seal a portion of the chamber, and an open position providing access to a portion of the chamber, the door comprising a resonant LC circuit receiver, the resonant LC circuit receiver comprising a bridge rectifier and a buck converter; and
   an articulating mullion rotatably hinged to the door, the articulating mullion comprising a resistive heating element electrically connected to the buck converter,
   wherein the buck converter steps down a direct current from the bridge rectifier to a predetermined direct current voltage, and
   wherein the resonant LC circuit transmitter and the resonant LC circuit receiver are inductively coupled in the closed position of the door, and
   wherein a current is induced in the resonant LC circuit receiver when the resonant circuit transmitter and the resonant LC circuit receiver are inductively coupled.

2. The refrigerator appliance of claim 1, wherein the inductive coupling of the resonant LC circuit transmitter and the resonant LC circuit receiver transfers electric power from the resonant LC circuit transmitter to the resonant LC circuit receiver.

3. The refrigerator appliance of claim 1, wherein the resonant LC circuit transmitter comprises:
   a power supply providing prescribed voltage at a prescribed current;
   a filter stage;
   an LC tank;
   a MOSFET driver; and
   a half bridge inverter,
   wherein the MOSFET driver and the half bridge inverter cooperate to drive the LC tank at a frequency to produce a magnetic field.

4. The refrigerator appliance of claim 3, wherein the MOSFET driver and the half bridge inverter are in electronic communication with the LC tank to drive the LC tank at a resonant frequency.

5. The refrigerator appliance of claim 4, wherein the LC tank provides feedback to the MOSFET driver.

6. The refrigerator appliance of claim 3, wherein the transmitter includes an interlock circuit placed electrically in-line between the MOSFET driver and the power supply to selectively allow power to flow from the power supply to the MOSFET driver.

7. The refrigerator appliance of claim 6, wherein the interlock circuit includes a door sensor to determine when the door is in the closed position.

8. The refrigerator appliance of claim 7, wherein the door sensor is a Hall effect sensor.

9. The refrigerator appliance of claim 6, wherein the power supply provides electrical power when the door is in the closed position.

10. The refrigerator appliance of claim 3, wherein the filter stage decouples a high frequency current in the LC tank from the power supply.

11. The refrigerator appliance of claim 1, wherein a natural resonance frequency of the resonant LC circuit receiver matches a natural resonance frequency of the LC tank.

12. The refrigerator appliance of claim 1, wherein the current induced in the resonant LC circuit receiver is an alternating current and is converted to a direct current by the bridge rectifier.

13. The refrigerator appliance of claim 1, wherein the resonant LC circuit transmitter and the resonant LC circuit receiver are inductively coupled across an air gap.

14. A refrigerator appliance defining a vertical direction, a lateral direction, and a transverse direction, the refrigerator appliance comprising:
- a cabinet comprising:
  - a first wall, a second wall, a top wall, and a bottom wall, the first wall and the second wall being spaced apart along the lateral direction, the top wall and the bottom wall being spaced apart along the vertical direction, the first wall, the second wall, the top wall, and the bottom wall defining a chilled chamber,
  - a resonant LC circuit transmitter mounted on a front face of the bottom wall, the resonant LC circuit transmitter configured to generate an electronic signal, and
- a door rotatably hinged to the cabinet, the door comprising:
  - a resonant LC circuit receiver being configured to receive the electronic signal generated from the resonant LC circuit transmitter when the door is in a closed position thereof, the resonant LC circuit receiver comprising a LC receiver, a bridge rectifier, and a buck converter, and
  - an articulating mullion rotatably hinged to the door, the articulating mullion comprising a resistive heating element electrically connected to the buck converter,
- wherein the resonant LC circuit transmitter and the resonant LC circuit receiver are inductively coupled in the closed position of the door to transfer power to the heating element within the articulating mullion.

* * * * *